US008462934B1

(12) United States Patent (10) Patent No.: US 8,462,934 B1
Cordell et al. (45) Date of Patent: *Jun. 11, 2013

(54) SYSTEM, METHOD, AND COMPUTER READABLE MEDIUM FOR ROUTING AN AGENT TO A PREFERRED COMMUNICATIONS PLATFORM IN ORDER TO RECEIVE A CUSTOMER CALL

(75) Inventors: Jeffrey William Cordell, Omaha, NE (US); Gregory Stuart Cardin, Omaha, NE (US); James K Boutcher, Omaha, NE (US)

(73) Assignee: West Corporation, Omaha, NE (US)

( * ) Notice: Subject to any disclaimer, the term of this patent is extended or adjusted under 35 U.S.C. 154(b) by 240 days.

This patent is subject to a terminal disclaimer.

(21) Appl. No.: 12/816,766

(22) Filed: Jun. 16, 2010

Related U.S. Application Data

(63) Continuation of application No. 11/361,321, filed on Feb. 24, 2006, now Pat. No. 7,769,160.

(51) Int. Cl.
*H04M 3/00* (2006.01)
*H04M 5/00* (2006.01)

(52) U.S. Cl.
USPC ............ 379/265.05; 379/265.01; 379/265.02; 379/266.01

(58) Field of Classification Search
USPC ............. 379/265.05, 265.01, 265.02, 266.01; 709/202, 232; 719/328
See application file for complete search history.

(56) References Cited

U.S. PATENT DOCUMENTS

| | | | |
|---|---|---|---|
| 5,884,032 A | 3/1999 | Bateman et al. | |
| 5,926,539 A | 7/1999 | Shtivelman | |
| 5,999,965 A * | 12/1999 | Kelly | 709/202 |
| 6,163,607 A | 12/2000 | Bogart et al. | |
| 6,173,053 B1 | 1/2001 | Bogart et al. | |
| 6,347,139 B1 | 2/2002 | Fisher et al. | |
| 6,356,632 B1 | 3/2002 | Foster et al. | |
| 6,510,221 B1 | 1/2003 | Fisher et al. | |
| 6,535,600 B1 | 3/2003 | Fisher et al. | |
| 6,553,114 B1 | 4/2003 | Fisher et al. | |
| 6,775,378 B1 | 8/2004 | Villena et al. | |
| 6,785,741 B1 | 8/2004 | Mandalia et al. | |
| 6,832,203 B1 | 12/2004 | Villena et al. | |
| 6,934,379 B2 | 8/2005 | Falcon et al. | |
| 7,010,610 B1 | 3/2006 | Ringhof et al. | |
| 2005/0043986 A1 | 2/2005 | McConnell et al. | |
| 2005/0071241 A1 | 3/2005 | Flockhart et al. | |
| 2005/0289356 A1 | 12/2005 | Shoham | |

* cited by examiner

*Primary Examiner* — Thjuan K Addy

(57) ABSTRACT

A system and method for routing an agent to a preferred communications platform in order to receive a customer call. The system may include a web server call notification module that receives an automatic number identification and information relating to an establishment whose phone number was dialed, and a virtual automated call distributor (VACD). Further, the system may include an interactive voice response (IVR) system that requests an agent's identification from the VACD, wherein the VACD and the web server are coupled to the IVR system, and wherein the VACD selects the agent's identification and routes a customer's information to an agent desktop environment (ADE) coupled to the VACD. Also included may be an access platform that receives the customer's information and updates an ADE phone control state session on an agent's desktop, wherein the customer's information is routed to the ADE environment through a message transfer layer.

18 Claims, 3 Drawing Sheets

SYSTEM, METHOD, AND COMPUTER READABLE MEDIUM FOR ROUTING AN AGENT TO A PREFERRED COMMUNICATIONS PLATFORM IN ORDER TO RECEIVE A CUSTOMER CALL

CROSS-REFERENCE TO RELATED APPLICATIONS

This application is a continuation from U.S. patent application Ser. No. 11/361,321, filed Feb. 24, 2006, and entitled "SYSTEM AND METHOD AND COMPUTER READABLE MEDIUM FOR ROUNTING AN AGENT TO A PREFERRED COMMUNICATIONS PLATFORM IN ORDER TO RECEIVE A CUSTOMER CALL", which is incorporated by reference herein in its entirety.

BACKGROUND

The present invention is related to call centers or contact centers, and, more specifically, to a system, method, and computer readable medium for routing an agent to a preferred communications platform or virtual contact center in order to receive a customer call. The present invention further advantageously provides the routing or matching of a contact center agent (such as a 'virtual' contact center agent) to a best or preferred contact center communications platform or desktop environment (that may be published) based on a number of attributes or profiles.

SUMMARY

A contact center comprises a group of trained agents or technicians that are typically required to use a telephone and a computer to perform their duties. Integration of voice (telephone) and data (PC) create an agents 'desktop environment.' A trend in contact center technology is the growing use of 'virtual' contact centers. This is based on the principle of employing contact center agents (employees and/or contractors) for the completion of contact center duties from their home or other remote location (i.e. working in general local office suites also referred to as 'hotel workers'). Virtual contact center agents require reliable network interconnectivity to include a Public Switched Telephone Network (PSTN) and Internet Protocol (IP) networks. The contact center provider typically provides or publishes the services and tools to perform agent authentication and encryption (secure data during transport), as well as to provide relevant $3^{rd}$ party application interfaces to complete the contact center agent duties. Clients employ contact center providers to perform their customer contact duties. Customers are those individuals that use some form of communication (telephone, email, instant message, fax, etc).

Virtual contact centers environments are hosted in internetworked environments. Individual environments may host several thousands of contact center agents, but all members can be affected by critical component failures. Multiple environments may be created to provide additional redundancy and improve overall service uptime to contact center clients. Distributing 'virtual' contact center agents across multiple hosting environments presents various challenges and opportunities. As such, a solution is needed to route agents to the 'best' environment for that individual agent at a given point in time.

In one embodiment of the present invention, a system for routing an agent to a preferred communications platform in order to receive a customer call comprises: a web server call notification module that receives an automatic number identification and information relating to an establishment whose phone number was dialed, a virtual automated call distributor (VACD), an interactive voice response (IVR) system that requests an agent's identification from the VACD, where the VACD and the web server are coupled to the IVR system, where the VACD selects the agent's identification and routes a customer's information to an agent desktop environment (ADE) coupled to the VACD, and an access platform that receives the customer's information and updates an ADE phone control state session on an agent's desktop, wherein the customer's information is routed to the ADE environment through a message transfer layer.

In another embodiment of the present invention a system for routing an agent to a preferred communications platform in order to receive a customer call comprises an interactive voice response (IVR) system that requests an agent's identification from a virtual automated call distributor (VACD) that selects an agent's identification and routes a customer's information to an agent desktop environment (ADE), an access platform that receives a customer's information and updates an ADE phone control state session on an agent's desktop, wherein the IVR system queries the ADE for user name information relating to the web server, wherein the ADE queries an agent table for a user name, wherein the IVR system sends the agent's identification and the agent's user name to the web server, and an order entry module that sends the customer's information to a web server client in the access platform, wherein the web server client updates the agent's screen with the customer's information, and wherein the agent is routed to a preferred communications platform at any time based on at least one of: a site, a project identification, a project load, and an attribute of the agent.

In a further embodiment of the present invention, a method for routing an agent to a preferred communications platform in order to receive a customer call, comprises receiving an automatic number identification and information relating to an establishment whose phone number was dialed; requesting an agent's identification from a virtual automated call distributor (VACD); selecting the agent's identification and routing a customer's information to an agent desktop environment (ADE) coupled to the VACD; and receiving the customer's information and updating an ADE phone control state session on an agent's desktop, wherein the customer's information is routed to the ADE environment through a message transfer layer.

DETAILED DESCRIPTION OF THE INVENTION

The present invention provides the routing of a contact center agent to a best contact center desktop environment based on a number of elements, attributes or profiles. This 'routing intelligence' of the present invention is applied to the selection of which virtual call center is most advantageous for an agent to join or attend. As such, a work-at-home or a virtual call center agent can join any virtual contact center based on the availability, ubiquity and type of the desktop environment as well as the transport environment (such as the Internet, for example). The present invention further couples a large pool (hundreds or thousands or more) of 'virtual' contact center agents with redundant or multiple contact center provider environments in a 'best possible' manner. In any given case, the 'best possible' environment can potentially be established based on a number of factors, profiles, and attributes that will be discussed in more detail below.

Figure 1:
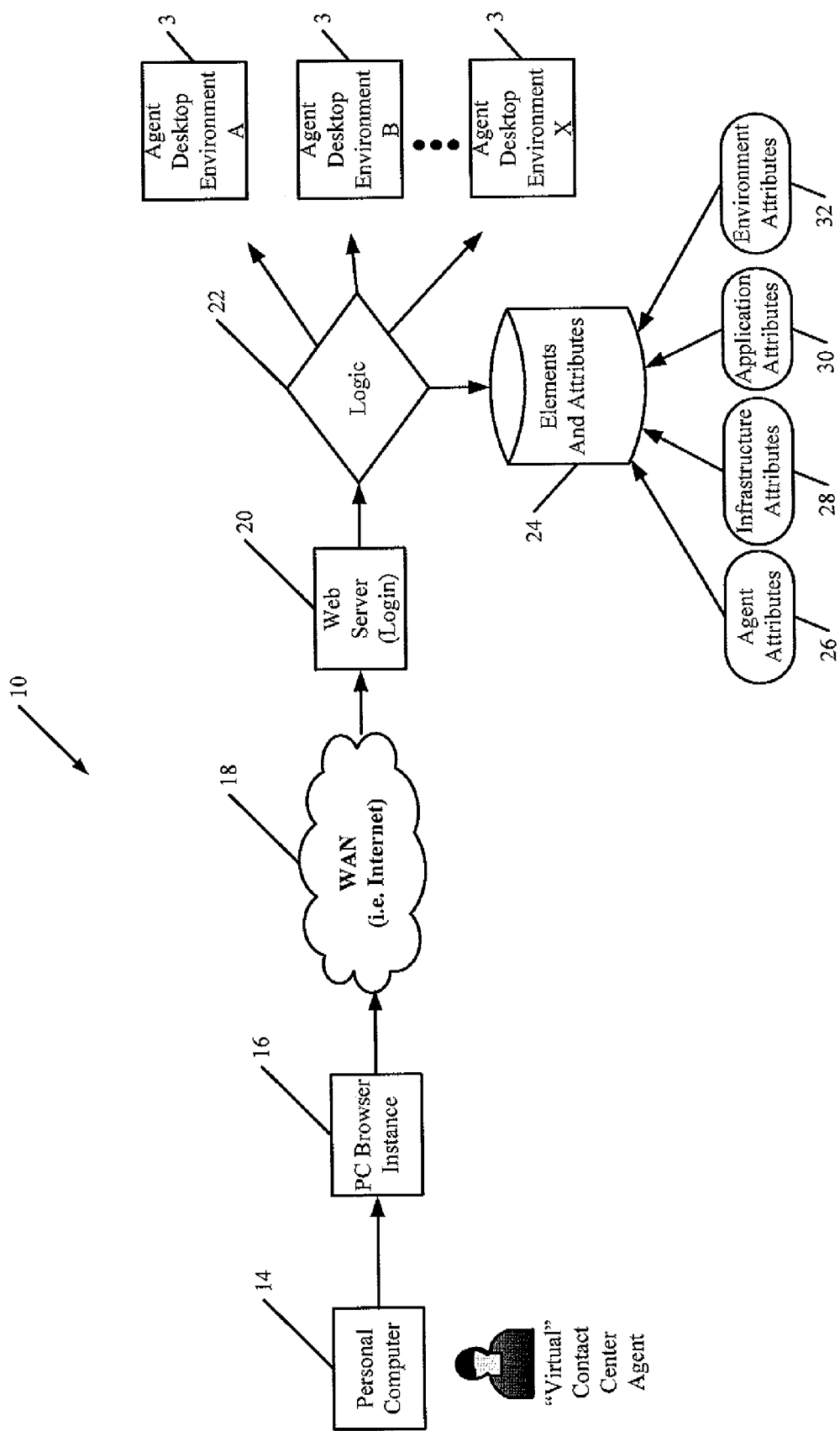
FIG. 1 depicts a process of utilizing attributes of the present invention to determine a routing of a contact center agent to a best contact center desktop environment in accordance with a preferred embodiment of the present invention.

Referring now to FIG. 1, the general process 10 associated with a virtual contact center agent's 12 interaction with the logic 22 of the present invention. The general steps include: utilizing a login function 20, an authentication mechanism which may be a part of or an extension of the login function, utilizing a logic 22 of the present invention which describes the selection process of the best possible environment, and agent session routing to the preferred environment 34-38.

Login Page

The login page 20 requires (assumes) the home agent 12 has access to the hosted provider server via the same IP network. In most cases, the home agent 12 utilizes a PC 14 (which may be a wired and/or a wireless device) and via a browser instance 16, accesses the Internet 18 which is the preferred medium due to the inherent cost savings with such a public mechanism. The preferred 'virtual' contact center agents who acquire high-speed broadband access to the Internet are the target (preferred) mode of access. The same logic 22 could be used if certain dedicated or 'hoteling' environments existed where dedicated paths provide bandwidth at a certain Quality of Service, for example. In this case, the login page 20 also provides the uniform warnings and validations each time a virtual contact center agent accesses proprietary systems. The right to record all activity of the sessions and prosecute for unauthorized use is a critical function for security purposes.

Authentication

The authentication mechanism can implement any standard Information Technology (IT) form user authentication. For example, various Active Directory and application user accounts (names stored in a secure database) can be used. Lighweight Directory Access Protocol (LDAP) and any number of third party biometric authentication applications can be applied at this step to meet various requirements. The login credentials (i.e. username/password) can be validated and the agents can be checked for current certifications and to confirm that they are scheduled to perform a shift.

Logic

The logic 22 of the present invention can be employed in a number of unique attributes 24 serially or in combination to select the 'best' connection method for the individual 'virtual' contact center agent. Below is a list of the attributes or profiles 24 that can be utilized for agent routing:

Agent Attributes

The agent attributes 26 include providing agent routing by agent certification and rating. In a potential pool of thousands of 'virtual' contact center agents, there will be certain differences that may be relevant to routing a contact center agent to a particular agent desktop environment. Levels and/or combinations of certifications on Client applications and call-types may be a reason for routing a virtual agent to specialized agent desktop environments. Historic performance of the 'virtual' contact center agent may establish a 'preferred rating' and therefore obtain a connection to a preferred or 'specialized' agent desktop environment. Specialized environments may include additional server infrastructure for improved performance or security, pre-released (e.g. "Beta") environments for early feedback on new/modified features or functionality.

Infrastructure Attributes

The infrastructure attributes 28 include an infrastructure availability which takes into account detected errors, failures, maximum utilization threshold conditions that occur at various levels within a series of servers used to present the agent desktop environment. Services and platforms can be removed from agent consideration based on various feedback mechanisms. Pre-planned maintenance windows are another reason contact centers may remove infrastructure elements from 'virtual' contact center agent consideration. The logic of the present invention can 'route' agents away from environments with limited, failed, or temporarily unavailable resources.

Application Attributes

The application attributes 30 include an agent's desktop environment. In a large pool of Clients, there will be potentially thousands standard and proprietary applications as well as specialized backhaul or interface requirements that contact center providers will be need to publish to the 'virtual' contact center agent. These environments can include combinations of web-based applications, terminal session access to mainframe-style systems, and window-based client installation (fat client) applications. The picker logic may route 'virtual' contact center agents to various environments that may be hosted via thin client (i.e. Citrix or Terminal servers session), web portal (Host various website and web-enabled applications), or VPN (Virtual Private Network) to provide specialized network access to run applications and web services from the local 'virtual" contact center agent desktop PC.

Environment Attributes

The environment attributes 32 include a connection history or affinity that is related to a contact center provider keeping audit, logging information, and the like on an observed performance of the infrastructure or the use of the infrastructure (i.e. network and application errors, communication latency, etc). In certain situations, the Internet or internet service provider networks provide WAN transport between a contact center agent and the various contact center environments. These provider and carrier networks have potentially unique elements that could affect a virtual agent's performance. These elements include reconnection requests, bandwidth, latency, hop count, firewalls, MPLS configuration, QoS, 'Superproxies,' content delivery network caching mechanisms, route flapping, and the like.

The logic of the present invention may systematically review and score the elements listed above and select the 'best' contact center environment for each particular agent. These elements may change for an individual agent throughout time (even throughout the day). An affinity to a particular environment will likely be created. This affinity function may be used in the case of quick connect or inconclusive connection history. Additionally, an environment 'scan' may be performed by the virtual agent desktop to check for new and potentially individually 'better' connections. Virtual contact center agents with repeated or chronic connection issues may be ideal candidates for alternate 'safe mode' or new pre-release 'beta' connection environments to resolve issues.

The environment attributes 32 are further related to clients and agent environments. For example, contact centers contract with various clients. The logic of the present invention can route all virtual contact center agents for a client A to a site A and route all virtual contact center agents for a client B to a site B. Clients may also be simultaneously supported across multiple geographically dispersed environments as a method of increasing platform reliability to compensate for some inherent inabilities to guarantee service on the Internet. Hosting client applications across multiple agent desktop environments may be more expensive than a standard single site offering. Additional contract rates may be negotiated for hosting across multiple environments.

In a virtual contact center agent environment, a WAN is typically involved. In many cases, the links and bandwidth required to connect geographically dispersed agents to the various contact center provider environments are made available via the Internet. The amount of throughput and latency associated with the link or links will directly affect the quality of the interaction with the virtual contact center agent. This will become particularly relevant when a voice portion utilized by the virtual agent transitions from the PSTN to a VoIP network. Coordinated efforts to connect in a more direct manner to particular internet service providers or ISPs (also known as peering relationships) will become increasingly important in the effort to provide high-throughput, low latency connections. The logic of the current invention may detect or reference a populated database of agent ISP profile information to make a routing decision to a best contact center provider environment. This best network decision may change throughout the course of a day or shift. Further, dynamic connection and session information may be stored that would permit mid-shift or mid-call transitions from environment A to environment B.

Routing Mechanism

After the logic 22 of the present invention has chosen the best environment for an individual agent based on the attributes 26-32, a routing mechanism of the present invention may select a redirection message back to the virtual agent desktop to initiate a new session to the appropriate environment. The login credentials can automatically post to the new site to create a 'single sign-on' appearance to the virtual agent. The routing mechanism may also maintain a connection to agent and selected environment in the case that mid-shift or mid-shift environment modifications can occur. The routing mechanism may also elect to insert virtual agent session information (e.g. akin to a browser cookie) to detect and potentially correct if an agent is repeatedly cycling (or looping) through the logic of the present invention.

Figure 2:
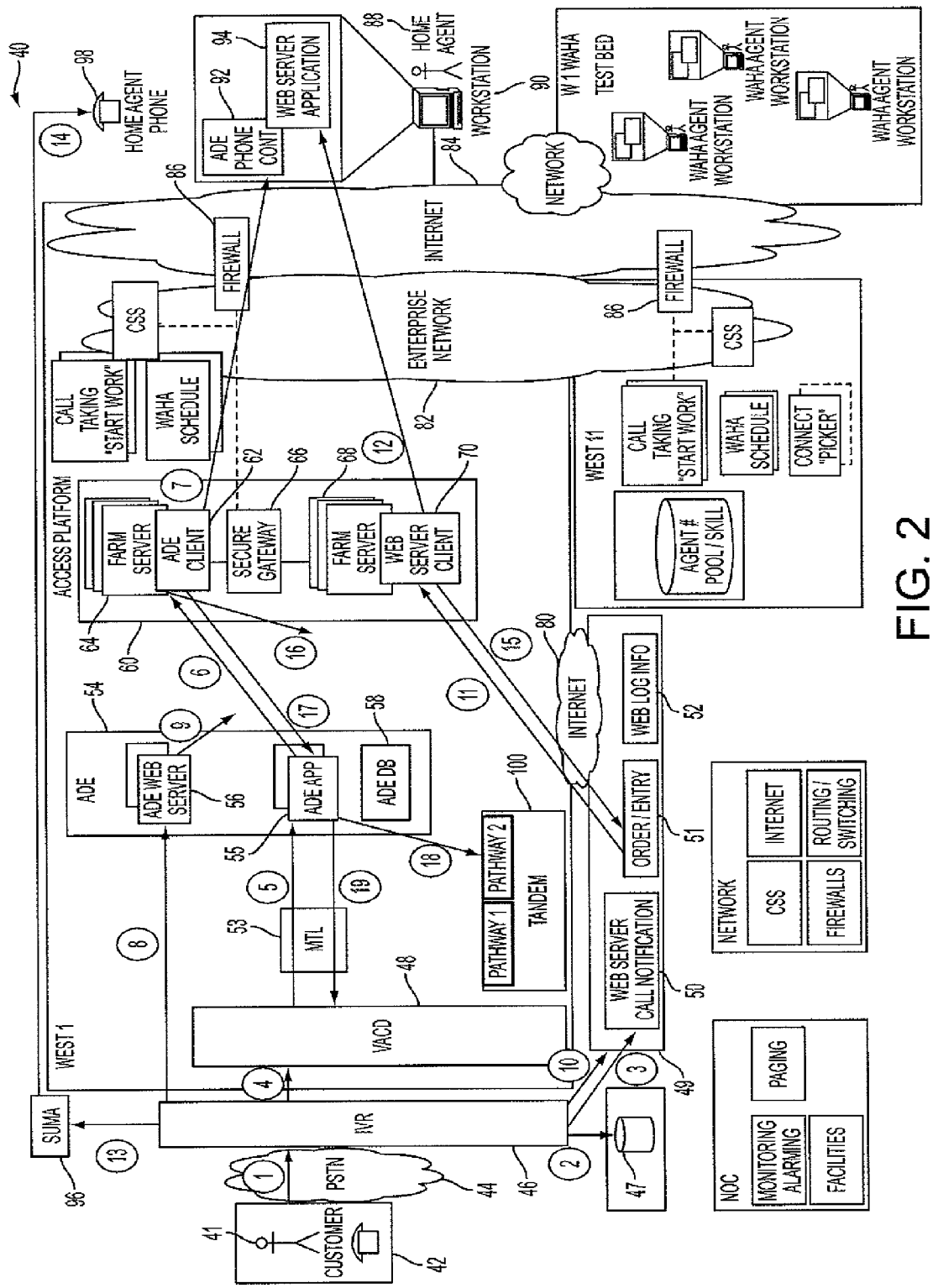
FIG. 2 depicts a system diagram describing the logic used in determining the routing of a customer call to a contact center agent that is utilizing a preferred communications platform in accordance with a preferred embodiment of the present invention.

Referring now to FIG. 2, a system 40 describing the logic used in determining the routing of a customer call to a contact center agent is depicted. The system is accessed by a customer 41 using a telephone 42 to make a call (step 1) which is routed through the PSTN 44 to an interactive voice response (IVR) unit or platform 46. In other embodiments, the customer 41 can use another device to access the IVR 46 via the PSTN 44 (such as, for example, a computer), can access the IVR 46 via a data or Internet Protocol network (not shown), and/or via wired or wireless access. The IVR 46 then queries (step 2) a database 47 to determine the hours of operation of an establishment and the status of the OCC/VCC. The database may be located in a same location or in a different location of the IVR 46.

The IVR platform 46 then sends (step 3) an automatic number identification (ANI) and information relating to the establishment that was dialed to a web server 49, and more specifically, to a web server call notification module 50. The web server 49 further includes an order entry module 51 and a web log module 52. The IVR 46 then requests (step 4) an Agent's ID (such as, for example, Agent 88's ID) from the virtual automated call distributor (VACD) 48 which selects the Agent's ID and routes (step 5) a "screen pop" to an agent desktop environment (ADE) through a message transfer layer (MTL) 53. The Agent 88 is preferably an at home agent but may also be a mobile agent (whereby the agent would communicate wirelessly and potentially on the move) or a call center agent. A screen pop is a feature in telephone-based customer service applications that brings up a customer record automatically on the screen of the agent/customer service representative when they receive a call. An ADE interface allows agents to process calls, control the telephone, view messages from operations supervisory staff, to coordinate incoming calls with various applications, supports host connectivity and data exchange, and to allow an agent to access all necessary information.

The screen pop is specifically routed to an ADE application 55 within the ADE 54, which further includes an ADE web server 56 and an ADE database 58. The ADE application then sends (step 6) the screen pop information to an access platform 60 (which provides secure, well-managed access to information), and more specifically, to an ADE client 62 that is part of a server farm 64. The access platform further includes a secure gateway 66 and another server farm 68 that includes a client 70 of the web server 49. The ADE client 62 updates (step 7) the Agent's 88 desktop or workstation 90 and notifies the Agent of the incoming call. More specifically, the ADE client 62 updates an ADE phone control state session 92 on the Agent's workstation 90, which also includes a web server application 94. The IVR platform 46 then queries (step 8) the ADE Web server 56 for username information relating to the web server 49. The ADE web server 56 queries (step 9) a home agent table (not shown) for a user name.

The IVR platform 46 sends (step 10) the Agent ID and the username to the web server 49. The order entry module 51 sends (step 11) the screen pop to the web server client 70 which updates (step 12) the Agent's screen pop with the caller's 41 information. The IVR platform 46 sends (step 13) out-dial information to a switch 96 (Summa switch), such as a programmable switch that offers services such as voice mail, calling card, and voice activated dialing. The switch 96 out-dials (step 14) to the Agent's 88 telephone 98 whereby the Agent answers the phone and performs (step 15) an order/entry function via the order/entry module 51 and submits the caller's 41 order. The ADE client 62 queries (step 16) the web server 49 for sales order information, and submits (step 17) the disposition back to the ADE application 55. The ADE application 55 logs (step 18) order information to a tandem service 100 which, for example, saves order information into a database or storage device, and sends (step 19) a status back to the VACD 48 to prepare for the next call.

Figure 3:
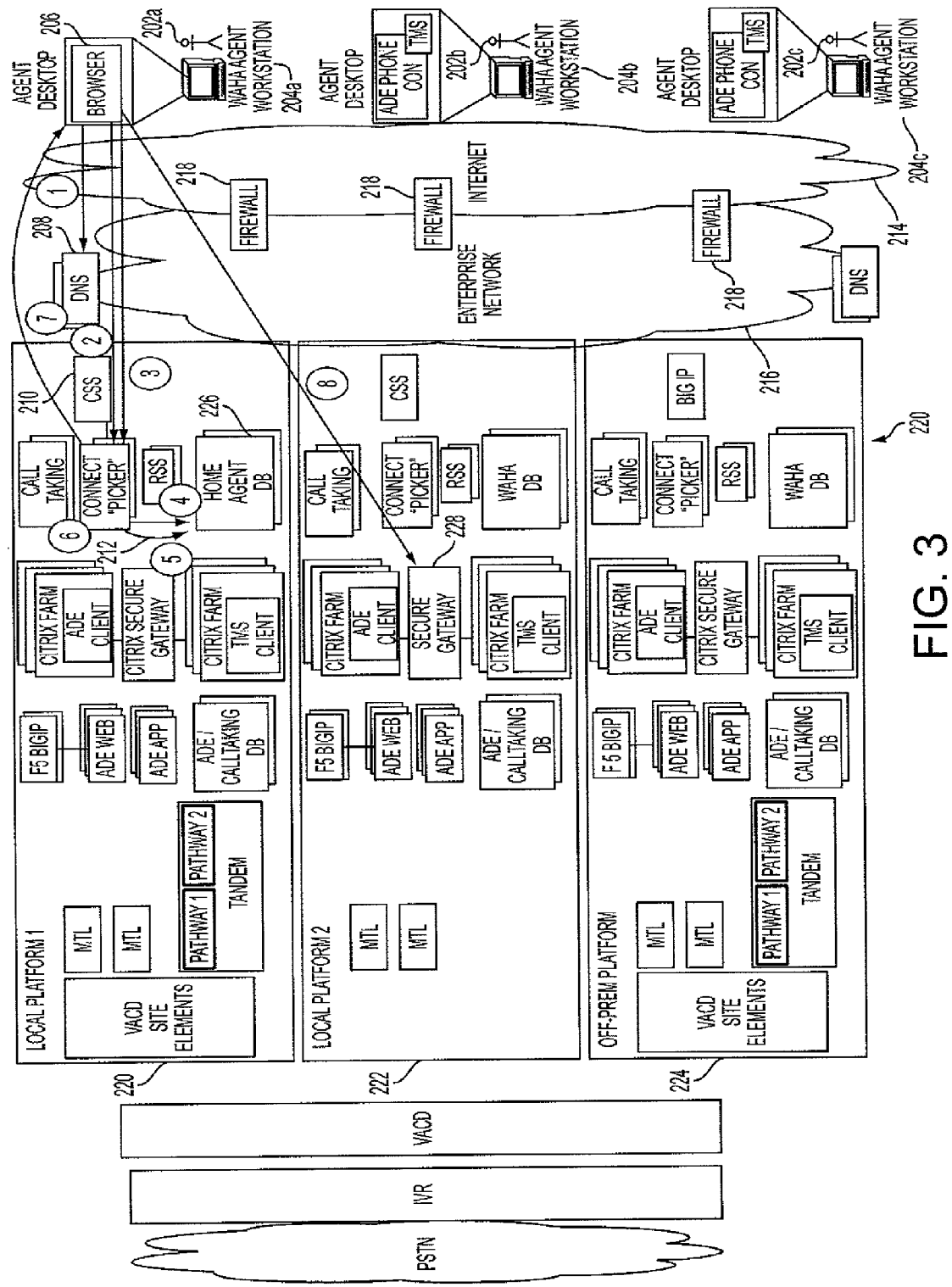
FIG. 3 depicts a system diagram describing the logic used in determining a preferred environment or platform for a contact center agent in accordance with a preferred embodiment of the present invention.

Referring now to FIG. 3, a system 200 of the present invention depicts the logic used in determining a preferred environment or platform preferably for a home agent or an agent located away from a contact or call center such as Agents 202a-202c. In other embodiments, the preferred environment or platform can be found for a contact or call center agent. An agent, for example Agent 202a initially accesses a workstation 204a and opens a browser 206 to enter (step 1) a working environment by accessing a domain name server (DNS) 208. The DNS 208 returns one of many possible IP address entries for "connect" services (for example, IP entries are selected via a round-robin manner). The Agent browser 206 then performs (step 2) a 'get' to a selected 'picker server' via a content services switch (CSS) 210 which provides load balancing functionality and receives a login page, and further enters (step 3) a username/password and clicks "Log in" to submit via a secure manner (for example, via secure socket layer) to the 'picker server' 212. The picker server 212 preferably stores the software, known as a picker script, of the present invention which will be described further below.

A picker script running on or via the server 212 performs (step 4) password validation and agent ID lookup, project ID lookup, and validates the Agent's 202*a* 'scheduled to work' check with the home agent database 226. The picker script also performs (step 5) a 'preferred environment' lookup with the home agent database 226 based on a picker routing strategy that will be described further below. The picker script forms (step 6) a login string combining selected environment/username/password/agentID information, and passes (step 7) the formed 'login string' back to the Agent's browser 206 via a secure manner. The Agent's browser 206 posts (step 8) a login string to the correct environment 222 and automatically logs the Agent 202*a* in to start work via a secure gateway 228. The Agent's workstations 204*a*-204*c*, which may have wireless connectivity or which may be different devices (not shown) that have wireless connectivity, preferably connect to the various platforms or environments 220-224 (which is a non-local platform or environment) via the Internet (or other data network) 214, an enterprise network 216, and a firewall 218. In other embodiments, fewer than these elements 214-218 may be utilized.

The Picker Routing Strategy

Given the Picker's ability to route across the Internet to multiple virtual contact center environments, a method is needed to systematically provide a 'preferred' environment for the agent. The 'next' or 'least loaded' virtual site works for general load balancing, but a routing strategy that can appropriately incorporate agent-specific attributes along with the site attributes to pick the 'best' environment of an agent is preferred. As such, a method that incorporates the Site, Project, System Load and Agent Attributes into a logical entity is a further characteristic of the present invention. The goal is to have the most relevant elements take precedent over lesser elements in picking the 'best' environment for a particular agent. For example, an agent would not be sent to an environment that is full or out of service due to the individual agent's lower latency connection to that particular environment.

In practice, an agent would present his/her username/password to the login web page. Other login processes can be utilized without departing from the scope of the present invention. A first check would be conducted to a remote agent scheduling database to validate that the agent is a) scheduled to work and b) the particular project the agent is scheduled to complete. The routing strategy is depicted by the following formula: Routing Strategy=Site (A)+Project ID (B)+Project Load (C)+Agent Attributes (D). In the case of these four variables, order of operations applies. The value of (A) takes precedence of variables (B), (C), (D). The value of (B) take precedence of (C) and (D), etc. Therefore, the highest number 'wins' and values are read from left to right.

A example of the routing strategy now follows. For a given agent, the registry values are presented below:

Site A Registry=200.198.14.155
Site B Registry=199.198.15.189
Site C Registry=200.198.15.203

Site B would not be preferred because its Site value ($1^{st}$ value) is the lowest value. Site C would be selected over Site A because the Project Load value ($3^{rd}$ value) is higher. If needed, Site C would also be selected over Site B because the Agent Attributes ($4^{th}$ value) is higher.

The present invention includes the following formulas, descriptions, and conventions to implement this routing strategy as software or a computer readable medium, as a method, or in a system.

Site Load

A=8 bit variable describes the state of the virtual contact center (site)

A=_ _ _ _ _ _ _ _ ranging from 00000000 to 11111111

The first (left-most bit) is a binary indicating:
1=Site Available (i.e. 10000000)
0=Site Not Available (i.e. 00000000)

The second-bit defines:
1=Site Accepting Connections (i.e. 11000000)
0=Site Not Accepting Connections (i.e. 10000000)

Bits 3 through 8 will be for Site load capabilities

For the purposes of a virtual contact center, an arbitrary maximum capacity is defined to be 1500 simultaneous virtual agent positions (seats). Bits 3 through 8 describe the relative loading, where a higher numeric value describes a lesser loaded site.

An example now follows:
M=Max Seats=1500
Target Site Max Utilization=U=80% (1200 seats)
Therefore the inverse of the Target Site Utilization defines Site Loading (L).
S=Site loading sensitivity (2 (very load sensitive)–50 (not load sensitive))
S=10 (default)
U=Utilization as % of Max Seats
L=load=(100−U)/S (fractions rounded down)

Environment A (site) is available, accepting connections and utilized to 80% will have an A registry value of 11000010 (binary) or 194 (decimal).

Environment B (site) is available, accepting connections and utilized to 55% will have an A registry value of 11000100 (binary) or 196 (decimal).

Environment C (site) site that is available, NOT accepting connections, and 22% utilized will have a registry value (A) of 10000111 (binary) or 135 (decimal).

In this Example, Site B would be the preferred environment for new connections.

Project ID

B=8 bit variable defines the unique project ID for a particular customer

B=_ _ _ _ _ _ _ _ ranging from 00000000 to 11111111 (255 possibilities)

The first bit is a binary indicating Project Availability:
1=Project Available (i.e. 10000000)
0=Project Not Available (i.e. 00000000)

The second bit is a binary indicating Project Accepting Connections:
1=Project Accepting Connections (i.e. 11000000)
0=Project Not Accepting Connections (i.e. 10000000)

Bits 3 through 8 will identify the project to be used individual clients. This scheme provides for 63 possible unique customers or projects hosted from virtual contact centers. The B variable could easily be expanded to a 16 bit variable (or more) to support 65,000+ (or more) customer projects. Project existence within a virtual environment needs to be verified before any additional agent can be considered for login.

For example:
00000000=reserved internal test project demo
00000001=reserved internal test project demo
00000010=Company A project
00000011=Company B project
00000100=Company B project bilingual
00000101=non-dedicated Company B project combined with Company A callers
00000111=Company B project (Beta) pre-release version Project Load C=8 bit variable defines the current system load of a particular project C=_____ ranging from 00000000 to 11111111 (255 possibilities)

For a given Project, Customer's typically 'request', 'purchase', or 'reserve' staffing capabilities in terms of seats. The goal is to distribute agents into virtual contact centers optimally. An important principle for the Project loading within a site is to avoid turning agents away under most normal circumstances. Simply stated, if a site is available and accepting connections, and project are also available and accepting connections; then allow the agent to utilize a 'seat' if one is available. Business logic described in (A) and (B) should suffice to create thresholds or limits for the protection of one client over another.

The first four bits (left-most bit) is a expansion and is to be 0 by default:

Expansion (i.e. 00000000)

'Quartile ranking' of project load will be used to permit agent level attributes to be implemented given general similarities across given environments. Bits 5 through 8 describe the relative loading based on the Max Seats variable where a larger (C) number on a given site mean less utilized.

S=Seats allocated for a client

The most common values for bits 5 through 8 are:

C=00001111←0-24% of S
C=00001110←25-49%
C=00001101←50-74%
C=00001100←75-99%
C=00001011←100-124%
C=00001010←125-149%
C=00001001←150-174%
C=00001000←175-199%
C=00000111←200-224%
C=00000110←225-250%

An example now follows:

A customer 'reserves' 200 seats to staff a particular call center function.

S=Seats allocated=200
Project seats currently utilized within Site A=38
Relative utilization=38/200=19%
Therefore C=00001111 (decimal 15) for site A
Project seats currently utilized within Site B=75
Relative utilization=75/200=38%
Therefore C=00001110 (decimal 14) for site B
Project seats currently utilized within Site A=45
Relative utilization=45/200=23%
Therefore C=00001111 (decimal 15) for site C In this example, Sites A and C are within the same (highest) relative quartile and therefore would defer to differing agent attributes for ultimate site selection.

Agent Attributes

D=8 bit variable defines the current system load of a particular agent's attributes D=_____ ranging from 00000000 to 11111111 (255 possibilities)

Network Latency and throughput score (composite)

The first 4 bits are binary indicating networking throughput and latency tested by that particular agent for a particular environment. This value can be obtained by observation of existing on-going connections and recorded for later use or via a quick 'traceroute' query initiated by the agent to each of the available site gateways at the beginning of each login session. A number of calculations could be set to model the composite score (to include ping, trace, lost packets, throughput testing, application testing, heartbeating, etc)

Bits 1 through 4 provide network throughput and latency:

D=00000000-11110000 (16 states available) (composite score 0(poor)-15(great))

Set a default value of Decimal 8 (midway between 0-15): D=10100000

Assume Average latency of 200 ms. (to obtain score of 8)

Decrease the Agent composite score by 1 for each 50 ms above average 200 ms

Increase the Agent composite score by 1 for each 50 ms below the average 200 ms

Connection History and Affinity

Bits 5 through 8 indicate connection history range D=00000000 through D=00001111

Set a default value of Decimal 8 (midway between 0-15) D=00001010

Decrease the Agent composite score by 1 for each successful work session.

Increase the Agent composite score by 1 if an improper disconnect is detected.

Connection history and affinity should be periodically reset (especially if there is a significant upgrade or change within the network or application).

An example now follows:

Agent initial network connection value:

D=10101010

A detected decrease of network latency for a particular session is found to be 96 ms increasing the value of the first nibble from 8 to 10 decimal (increase of 2).

Therefore D moves from: D=10101010 (decimal 170) to D=11001010 (decimal 202).

The elements of the routing strategy of the present invention, including site, project ID, project load, and agent attributes, have been described. Various examples that utilize the routing strategy formula (Routing Strategy=Site (A)+Project ID (B)+Project Load (C)+Agent Attributes (D)) now follows.

Example 1

Assume 3 different sites each capable of handling 1500 connections each. All sites are available and accepting connections for all project types. Company X has acquired 200 seats for use in the virtual contact center. Assume each site has the Project installed for company X across all three sites. All sites are accepting connections for company X. Project ID: 000110. No agents are current scheduled or logged into any sites (no seats utilized). This particular agent has no connection, latency or affinity history.

Routing Detail Registry Values:

| | |
|---|---|
| Site A: | A = 11110010. (242) |
| | B = 11000110. (198) |
| | C = 00001111. (15) |
| | D = 10101010 (170) |
| Site B: | A = 11110010. (242) |
| | B = 11000110. (198) |
| | C = 00001111. (15) |
| | D = 10101010 (170) |
| Site C: | A = 11110010. (242) |
| | B = 11000110. (198) |
| | C = 00001111. (15) |
| | D = 10101010 (170) |

An agent would present the login/password credentials and immediately be able to interrogate the database tables with the above values.

Site A=242.198.240.170;
Site B=242.198.240.170;
Site C=242.198.240.170.

In this unique case, Site A should be selected for this agent. A 'round robin' method can be applied for the next agent supplying valid credentials to be shuttled to Site B.

Example 2

The same defaults as example 1 exist, but after a period of time (for example, seconds, minutes, hours, days or weeks) a connection profile will be created and associated with either the site, project or agent. An agent Y would best login into Site C due to the following details:

Site A=
Site total 223 seats currently used
Site available and accepting connections
Project ID: 0110 available and accepting connections
Site A has 56 agents of the available 200 seats reserved for Customer X
Agent network latency averages 250 ms over the past 1 successful shifts from this agent
Site A Registry=11001000.11000110.00001110.10011011
Site A Registry=200.198.14.155
Site B=
Site total 375 seats currently used
Site available and accepting connections
Project ID: 0110 available and accepting connections
Site A has 41 agents of the available 200 seats reserved for Customer X
Agent network latency averages 49 ms over the past 5 successful shifts from this agent
Site B Registry=11000111.11000110.00001111.10111101
Site B Registry=199.198.15.189
Site C=
Site total 280 seats currently used
Site available and accepting connections
Project ID: 0110 available and accepting connections
Site A has 69 agents of the available 200 seats reserved for Customer X
Agent network latency averages 100 ms over the past 3 successful shifts from this agent
Site C Registry=11001000.11000110.00001110.11001011
Site C Registry=200.198.14.203

In this example, the 'best' connection for Agent Y is Site C. The reason site B was not selected is due to the overall site utilization (even though this site has fewer agents on the project and a better overall agent connection history). Site B and Site C fell within the same parameters for site and project distribution (even though there was a 13 person discrepancy in favor of Site A). Ultimately, the agent connection history established Site C as the 'best' connection for that agent (over site A).

Although an exemplary embodiment of the system, method, and computer readable medium of the present invention has been illustrated in the accompanied drawings and described in the foregoing detailed description, it will be understood that the invention is not limited to the embodiments disclosed, but is capable of numerous rearrangements, modifications, and substitutions without departing from the spirit or scope of the invention as set forth and defined by the following claims. For example, the capabilities of the systems 40, 200 of the present invention can be performed by one or more of the modules or components described herein or in a distributed architecture. For example, all or part of the functionality performed by the IVR platform 46, the VACD 48, the web server 49, the ADE 54, the access platform 60, the Agent's workstation 90, 204a-204c, the DNS 208, the CSS 210, the picker script 210, and the like may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless source, a wired source and/or via plurality of protocols. Still further, the workstations 90, 204a-204c may be a cellular phone, a computer or any type of device able to receive and send a message. Also, the messages sent or received by any of the modules may be sent or received directly and/or via one or more of the other modules or nodes (not shown).

What is claimed is:

1. A system for routing an agent to a preferred communications platform in order to receive a customer call, comprising:
    a web server call notification module that receives an automatic number identification and information relating to an establishment whose phone number was dialed;
    a virtual automated call distributor (VACD);
    an interactive voice response (IVR) system that requests an agent's identification from the VACD, wherein the VACD and the web server are coupled to the IVR system, and wherein the VACD selects the agent's identification and routes a customer's information to an agent desktop environment (ADE) coupled to the VACD; and
    an access platform that receives the customer's information and updates an ADE phone control state session on an agent's desktop;
    wherein the customer's information is routed to the ADE environment through a message transfer layer,
    wherein the agent is routed to the preferred communications platform at any time based on at least one of: a site, a project identification, a project load, and an attribute of the agent.

2. The system of claim 1, wherein the IVR system queries the ADE for user name information relating to the web server.

3. The system of claim 1, wherein the ADE queries an agent table for a user name.

4. The system of claim 1, wherein the IVR system sends the agent's identification and the agent's user name to the web server.

5. The system of claim 4, wherein an order entry module in the web server sends the customer's information to a web server client in the access platform, wherein the web server client updates the agent's screen with the customer's information.

6. The system of claim 5, further comprising a switch, wherein the IVR system sends out-dial information to the switch.

7. The system of claim 6, wherein the switch out-dials to an agent's telephone whereby the agent answers the phone and submits an order for the customer.

8. The system of claim 1, further comprising a tandem service, wherein the ADE logs order information to the tandem service.

9. The system of claim 8, wherein the tandem service sends a status back to the VACD to prepare for a next call.

10. A system for routing an agent to a preferred communications platform in order to receive a customer call, comprising:

an interactive voice response (IVR) system that requests an agent's identification from a virtual automated call distributor (VACD) that selects an agent's identification and routes a customer's information to an agent desktop environment (ADE);

an access platform that receives a customer's information and updates an ADE phone control state session on an agent's desktop; and an order entry module that sends the customer's information to a web server client in the access platform, wherein the web server client updates the agent's screen with the customer's information, and wherein the agent is routed to a preferred communications platform at any time based on at least one of: a site, a project identification, a project load, and an attribute of the agent, wherein the customer's information is routed to the ADE through a message transfer layer.

11. The system of claim 10, wherein the IVR system queries the ADE for user name information relating to the web server.

12. The system of claim 10, wherein the ADE queries an agent table for a user name.

13. The system of claim 10, wherein the IVR system sends the agent's identification and the agent's user name to the web server.

14. The system of claim 10, further comprising a switch, wherein the IVR system sends out-dial information to the switch.

15. The system of claim 14, wherein the switch out-dials to an agent's telephone whereby the agent answers the phone and submits an order for the customer.

16. The system of claim 10, further comprising a tandem service, wherein the ADE logs order information to the tandem service.

17. The system of claim 16, wherein the tandem service sends a status back to the VACD to prepare for a next call.

18. A method for routing an agent to a preferred communications platform in order to receive a customer call, comprising:

receiving an automatic number identification and information relating to an establishment whose phone number was dialed;

requesting an agent's identification from a virtual automated call distributor (VACD);

selecting the agent's identification and routing a customer's information to an agent desktop environment (ADE) coupled to the VACD; and receiving the customer's information and updating an ADE phone control state session on an agent's desktop, wherein the customer's information is routed to the ADE environment through a message transfer layer, wherein the agent is routed to the preferred communications platform at any time based on at least one of: a site, a project identification, a project load, and an attribute of the agent.

\* \* \* \* \*